(12) United States Patent
Qi

(10) Patent No.: US 8,530,101 B2
(45) Date of Patent: Sep. 10, 2013

(54) ANODE EXHAUST RECYCLE SYSTEM

(75) Inventor: Chunming Qi, Lexington, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 1195 days.

(21) Appl. No.: 12/221,914

(22) Filed: Aug. 7, 2008

(65) Prior Publication Data

US 2009/0047557 A1 Feb. 19, 2009

Related U.S. Application Data

(60) Provisional application No. 60/963,952, filed on Aug. 8, 2007.

(51) Int. Cl.
*H01M 4/00* (2006.01)
(52) U.S. Cl.
USPC .......................................... 429/415; 429/410
(58) Field of Classification Search
USPC .......................................... 429/410, 415, 408
See application file for complete search history.

(56) References Cited

U.S. PATENT DOCUMENTS

| | | | |
|---|---|---|---|
| 3,615,839 A | 10/1971 | Thompson et al. | |
| 4,751,151 A | 6/1988 | Healy et al. | |
| 5,079,103 A | 1/1992 | Schramm | |
| 5,380,600 A | 1/1995 | Hansen et al. | |
| 7,326,482 B2 | 2/2008 | Haltiner, Jr. et al. | |
| 7,553,568 B2 | 6/2009 | Keefer | |
| 2005/0008907 A1 | 1/2005 | Isozaki et al. | |
| 2005/0014038 A1 | 1/2005 | Aoyama et al. | |
| 2005/0123810 A1 | 6/2005 | Balan | |

(Continued)

FOREIGN PATENT DOCUMENTS

| | | |
|---|---|---|
| DE | 10 2004 010 165 A1 | 10/2004 |
| EP | 1 033 769 A1 | 9/2000 |

(Continued)

OTHER PUBLICATIONS

Communication from the European Patent Office, International Application No. 08 795 109.1-2119, date of mailing Jul. 26, 2010.
Noponen, M., et al. "Experimental Study of Anode Gas Recycling on Efficiency of SOFC," *30th Fuel Cell Seminar*, 5(1): 2006 (no month available).
"Notification of Transmittal of the International Search Report and the Written Opinion of the International Searching Authority, or the Declaration," from related application PCT/US2008/013764, 12 pp., mailed on Mar. 31, 2009.

(Continued)

*Primary Examiner* — Ula C Ruddock
*Assistant Examiner* — Frank Chernow
(74) *Attorney, Agent, or Firm* — Robert N. Young; Abel Law Group, LLP

(57) ABSTRACT

A fuel cell system includes a fuel cell stack including at least one fuel cell and a separator. Each fuel cell includes a cathode, an anode and an electrolyte between the cathode and the anode. The separator includes a membrane, and a housing defining an anode exhaust inlet, a recycled gas outlet and an exhaust gas outlet. The anode exhaust inlet and the recycled gas outlet are independently in fluid communication with the anode. The housing and the membrane defines at least in part a first chamber that is in fluid communication with the anode exhaust inlet, and a second chamber. In one embodiment, the membrane is an $H_2$-gas permeable membrane, the recycled gas outlet is in fluid communication with the second chamber, and the exhaust gas outlet is in fluid communication with the first chamber. In another embodiment, the membrane is a $CO_2$-gas permeable membrane, the recycled gas outlet is in fluid communication with the first chamber, and the exhaust gas outlet is in fluid communication with the second chamber.

10 Claims, 4 Drawing Sheets

(56) References Cited

U.S. PATENT DOCUMENTS

| | | | |
|---|---|---|---|
| 2005/0204920 A1* | 9/2005 | Hong et al. | 96/4 |
| 2006/0115691 A1 | 6/2006 | Hilmen et al. | |
| 2008/0241612 A1 | 10/2008 | Ballantine et al. | |

FOREIGN PATENT DOCUMENTS

| | | | |
|---|---|---|---|
| EP | 1 511 110 | | 3/2005 |
| JP | 1311572 | | 12/1989 |
| JP | 7302609 | | 11/1995 |
| JP | 2002093449 | * | 3/2002 |
| JP | 2004342413 | | 12/2004 |
| JP | 2007128786 | | 5/2007 |
| JP | 2007141772 | | 7/2007 |
| WO | WO 00/16426 | | 3/2000 |

OTHER PUBLICATIONS

Invitation to Pay Additional Fees and, Where Applicable, Protest Fees, from related application PCT/US2008/009485, 4 pp., mailed on Dec. 20, 2008.

"Notification of Transmittal of the International Search Report and the Written Opinion of the International Searching Authority, or the Declaration," PCT/US2008/009485, 15 pp., mailed Mar. 12, 2009.

Notification Concerning Transmittal of International Preliminary Report on Patentability (Chapter I of the Patent Cooperation Treaty) for Int'l Application No. PCT/US2008/009485, 8pp., mailed Feb. 18, 2010.

Machine Translation of JP2007128786, 15 pages.

Machine Translation of JP2007141772, 17 pages.

* cited by examiner

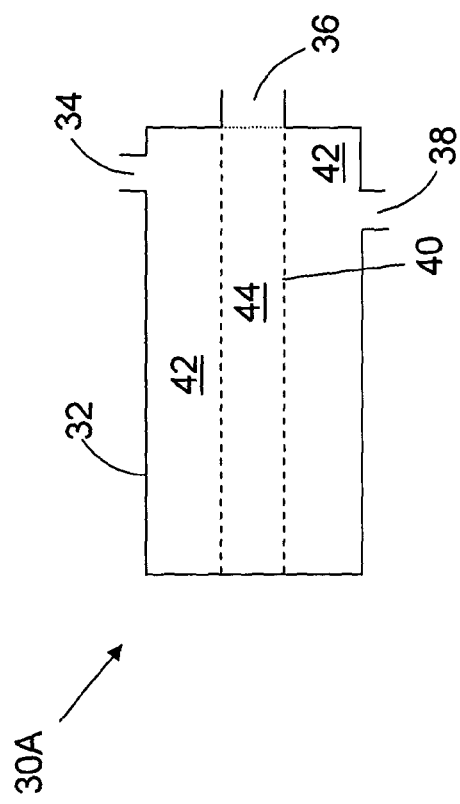
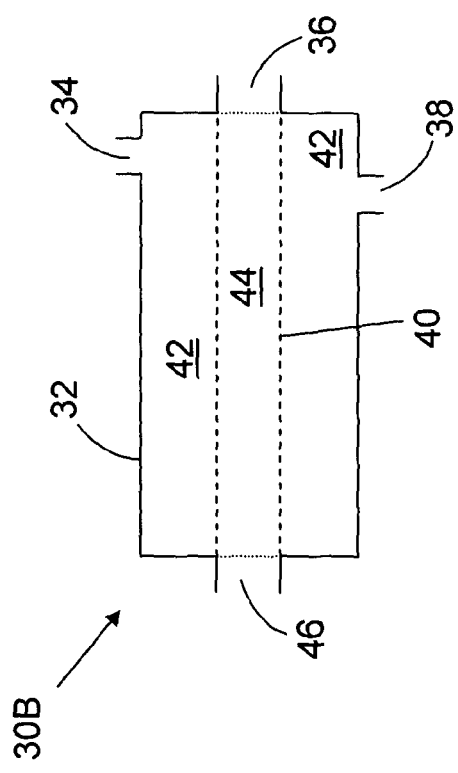
FIG. 2A
FIG. 2B

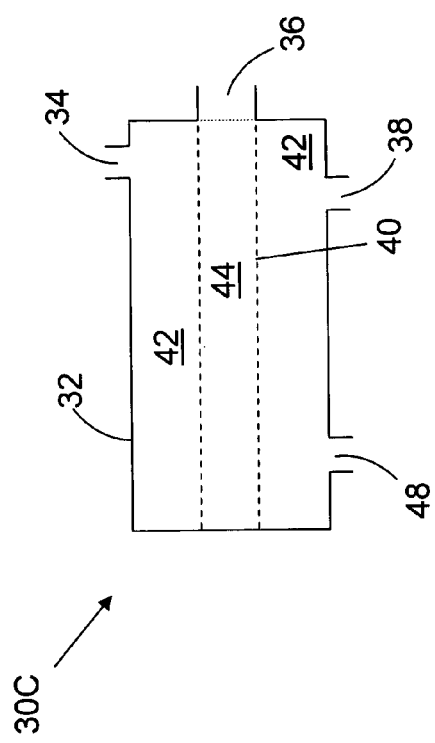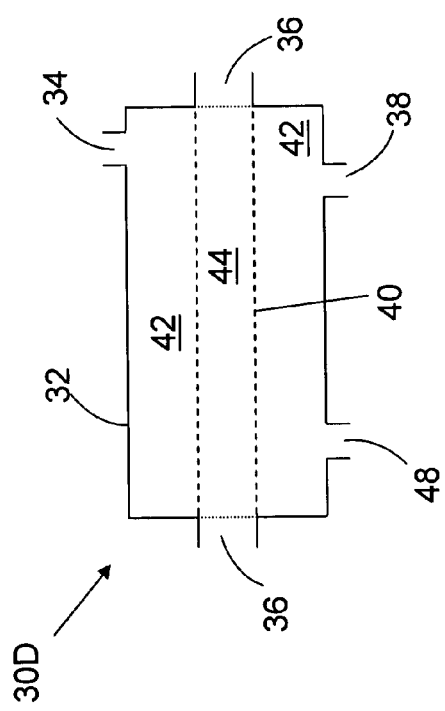

ANODE EXHAUST RECYCLE SYSTEM

RELATED APPLICATION

This application claims the benefit of U.S. Provisional Application No. 60/963,952, filed on Aug. 8, 2007. The entire teachings of the above application are incorporated herein by reference.

BACKGROUND OF THE INVENTION

Fuel cells can offer potentially clean, quiet and efficient power generation. Unlike thermal energy based engines, fuel cells use an electrochemical or battery-like process to convert the chemical energy associated with the conversion of hydrogen gas into water. Typically, in fuel cells, hydrogen gas and oxygen gas are fed into the anode and cathode of the fuel cell, respectively. At the anode, the hydrogen gas is electrochemically dissociated into hydrogen ions ($H^+$) and free electrons ($e^-$). The electrons flow out of the anode through an external electrical circuit. In polymer electrolyte membrane (PEM) fuel cells, in general, hydrogen ions ($H^+$) formed at the anode flow to the cathode through the PEM electrolyte. At the cathode, oxygen gas fed into the cathode is electrochemically combined with the hydrogen ions and with the free electrons to generate water. In solid oxide fuel cells employing a solid oxide electrolyte, in general, oxygen ions are electrochemically formed at the cathode and move to the anode through the solid oxide electrolyte. The overall reaction in a fuel cell is as follows:

$$2H_2 + O_2 \rightarrow 2H_2O(vapor) + Energy \qquad (1)$$

Despite the advantages of clean and quiet power generation, fuel cell systems have faced a number of formidable market entry issues resulting from product immaturity, over-engineered system complexity, fuel efficiency, etc. Fuel efficiency can be increased by employing larger surface areas of the anode and cathode, or by increasing the number of fuel cells in a fuel stack. However, these approaches typically result in increases in the size of the fuel stack.

Therefore, there is a need for developing methods of increasing fuel efficiency in fuel cell systems without compromising the size of the fuel cell system, and for developing fuel cell systems having high fuel efficiency, and in particular fuel cell systems of relatively small size.

SUMMARY OF THE INVENTION

The present invention is generally related to a fuel cell system that includes a separator for recycling anode exhaust, to a method of forming such a fuel cell system, and to a method of recycling anode exhaust in such a fuel cell system.

In one embodiment, the present invention is directed to a fuel cell system that includes a fuel cell stack including at least one fuel cell and a separator. Each fuel cell includes a cathode, an anode and an electrolyte between the cathode and the anode.

In one specific embodiment, the separator includes a housing defining an anode exhaust inlet, a recycled gas outlet and an exhaust gas outlet, and an $H_2$-gas permeable membrane. The anode exhaust inlet and the recycled gas outlet are independently in fluid communication with the anode. The housing and the membrane defines at least in part a first chamber and a second chamber. The first chamber is in fluid communication with the anode exhaust inlet and the exhaust gas outlet. The second chamber is in fluid communication with the recycled gas outlet.

In another specific embodiment, the separator includes a housing defining an anode exhaust inlet, a recycled gas outlet and an exhaust gas outlet, and a $CO_2$-gas permeable membrane. The anode exhaust inlet and the recycled gas outlet are independently in fluid communication with the anode. The housing and the membrane defines at least in part a first chamber and a second chamber. The first chamber is in fluid communication with the anode exhaust inlet and the recycled gas outlet. The second chamber is in fluid communication with the exhaust gas outlet.

In another embodiment, the present invention is directed to a method of forming a fuel cell system as described above. The method includes forming a fuel cell stack that includes at least one fuel cell, the fuel cell including an anode, a cathode and an electrolyte between the anode and cathode. The method further includes forming a separator. Features of the separator are as described above for the fuel cell system of the invention.

In yet another embodiment, the present invention is directed to a method of recycling anode exhaust gas in a fuel cell system. The fuel cell system includes a fuel cell stack including at least one fuel cell, and a separator. Each fuel cell includes a cathode, an anode and an electrolyte between the cathode and the anode. Features of the separator are as described above for the fuel cell system of the invention.

In one specific embodiment of the method of recycling anode exhaust gas, the separator includes a housing defining an anode exhaust inlet, a recycled gas outlet and an exhaust gas outlet, and an $H_2$-gas permeable membrane. Other features of this separator are as described above for the separator of the fuel cell system of the invention, which includes an $H_2$-gas permeable membrane. In the method, an anode exhaust gas is directed from the anode of the fuel cell to the separator. The anode exhaust gas includes $H_2$ gas. The anode exhaust gas is then transported into the first chamber through the anode exhaust inlet, and at least a portion of the $H_2$ gas contained in the anode exhaust gas permeates through the membrane into the second chamber to thereby form recycled anode-exhaust gas that includes the $H_2$ gas in the second chamber, and leave $H_2$-deficient exhaust gas in the first chamber. The recycled anode-exhaust gas is directed to the anode of the fuel cell.

In another specific embodiment of the method of recycling anode exhaust gas, the separator includes a housing defining an anode exhaust inlet, a recycled gas outlet and an exhaust gas outlet, and a $CO_2$-gas permeable membrane. Other features of this separator are as described above for the separator of the fuel cell system of the invention, which includes a $CO_2$-gas permeable membrane. In the method, an anode exhaust gas is directed from the anode of the fuel cell to the separator. The anode exhaust gas includes $CO_2$ and $H_2$ gases. The anode exhaust gas is then transported into the first chamber through the anode exhaust inlet. At least a portion of the $CO_2$ gas contained in the anode exhaust gas permeates through the membrane into the second chamber to thereby form $CO_2$-rich exhaust gas in the second chamber, and form recycled anode-exhaust gas that is $CO_2$-gas deficient in the first chamber. The recycled anode-exhaust gas is directed to the anode of the fuel cell.

With the present invention for recycling anode exhaust, total fuel utilization can be increased, potentially near 100% fuel utilization. As such, the efficiency of the fuel cell system of the invention can be increased, compared to one that does not have a separator to recycle anode exhaust. This high efficiency of the fuel cell system can in turn allow to use a relatively small sized fuel stack. The fuel cell systems of the invention can be used in various applications, for example, to generate power and/or generating hot water.

Typically, in order to produce hydrogen gas from hydrocarbon fuel sources, such as natural gas, the fuel sources need to be reformed or pre-reformed using an oxygen source, such as steam and/or oxygen gas, to prevent elemental carbon formation. Steam has often been used in the art. To generate such steam, a boiler or steam generator is generally required, which makes the fuel cell system more complex and large in scale. In addition, a water purifying system is often further required to protect catalysts. In contrast, in the present invention, substantially pure hot water (steam) is recycled, and thus, extensive water treatment units, and steam generators or boilers, generally are not necessary, thereby simplifying the fuel cell system.

BRIEF DESCRIPTION OF THE DRAWINGS

FIGS. 2A-2D are schematic drawings of some separators that can be used in the invention.

DETAILED DESCRIPTION OF THE INVENTION

Figure 1:
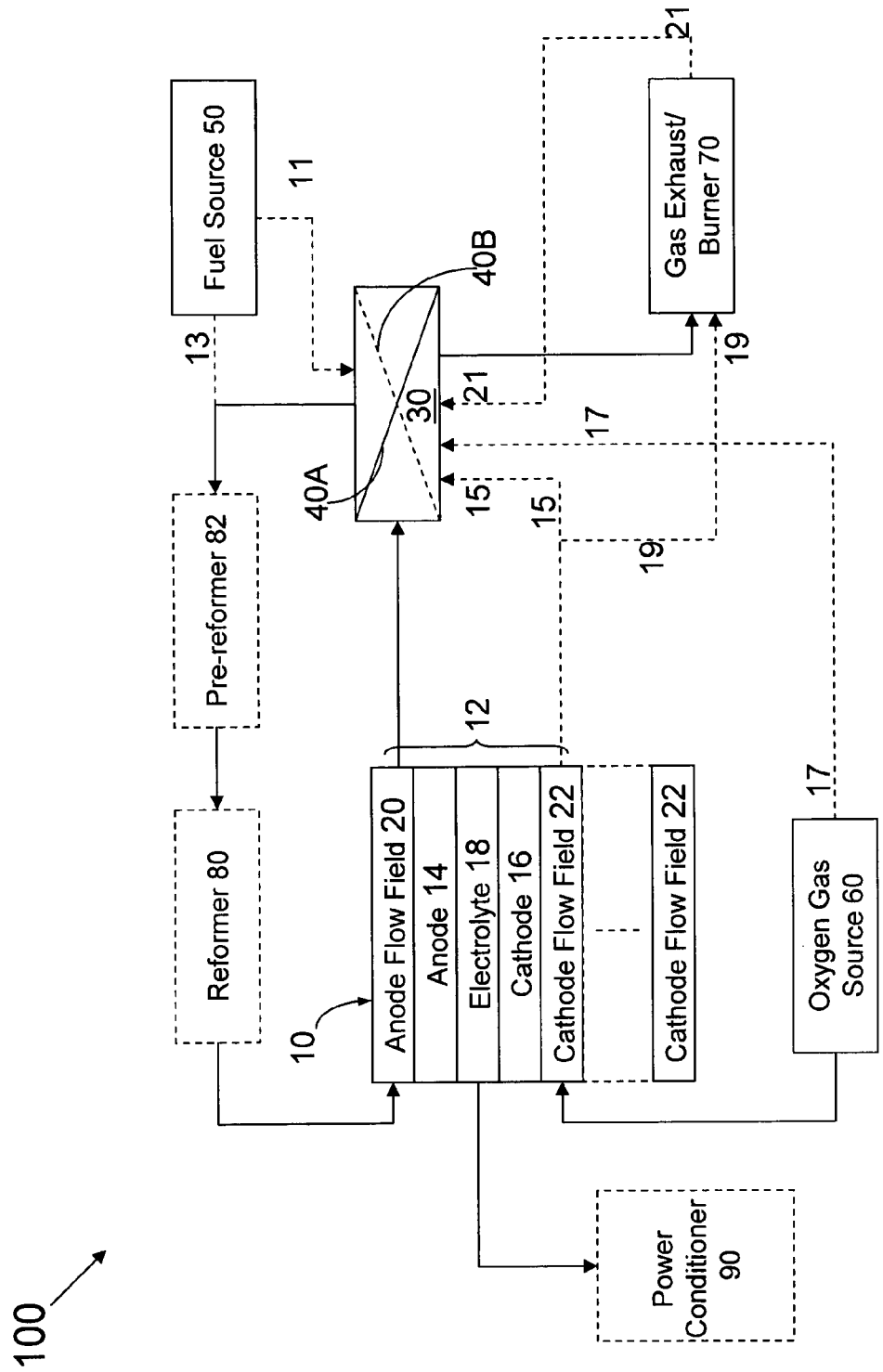
FIG. 1 is a schematic drawing of a fuel cell system of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 1 shows one embodiment of the fuel cell systems of the invention, fuel cell system 100. Fuel cell system 100 includes fuel cell stack 10, separator 30, fuel source 50, oxygen gas source 60 and gas exhaust 70. Fuel cell stack 10 includes at least one fuel cell 12. Fuel cell 12 includes anode 14, cathode 16 and electrolyte 18. Anode 14 is in fluid communication with fuel source 50, such as $H_2$ gas or a natural gas which can be converted into $H_2$, optionally via anode flow field 20. Cathode 16 is in fluid communication with oxygen gas source 60, such as air, optionally via cathode flow field 22. Separator 30 that include membrane 40 (which is referred to herein collectively for membranes 40A and 40B) is in fluid communication with anode 14 of fuel cell 12 and with gas exhaust or burner 70, optionally via reformer 80 and/or pre-reformer 82. In one embodiment, separator 30 includes $H_2$-gas permeable membrane 40A. In another embodiment, separator 30 includes $CO_2$-gas permeable membrane 40B. As shown in FIG. 1, fuel cell system 100 can further include power conditioner 90.

Referring to FIG. 2A, one embodiment of separator 30, separator 30A, is depicted in the figure. As shown in FIG. 2A, separator 30A includes housing 32 defining first gas inlet 34, first gas outlet 36 and second gas outlet 38. Separator 30A further includes membrane 40. Housing 32 and membrane 40 define at least in part first chamber 42 and second chamber 44. First chamber 42 is in fluid communication with first gas inlet 34 and second gas outlet 38. Second chamber 44 is in fluid communication with first gas outlet 36.

Another embodiment of separator 30, separator 30B, is depicted in FIG. 2B. As shown in FIG. 2B, separator 30B includes the features of separator 30A described above, and further includes second gas inlet 46 in fluid communication with a fuel gas source and with second chamber 44.

Another embodiment of separator 30, separator 30C, is depicted in FIG. 2C. As shown in FIG. 2C, separator 30C includes the features of separator 30A described above, and further includes third gas inlet 48 in fluid communication with first chamber 42.

Referring to FIG. 2D, another embodiment of separator 30, separator 30D, is depicted in the figure. As shown in FIG. 2D, separator 30D includes the features of separator 30A described above, and further includes second gas inlet 46 in fluid communication with second chamber 44, and third gas inlet 48 in fluid communication with first chamber 42.

Referring to FIGS. 1 and 2A-2D, in one embodiment of fuel cell system 100, separator 30 (which is collectively referred to for separators 30A-30D hereinafter) employs $H_2$-gas permeable membrane 40A that can selectively permeate at least $H_2$-gas. In this embodiment, first gas inlet 34, first gas outlet 36 and second gas outlet 38 of separator 30 are anode exhaust inlet, recycled gas outlet and exhaust gas outlet, respectively. In this embodiment, first gas inlet 34 (i.e., anode exhaust inlet) is in fluid communication with anode 14 of fuel cell 12. First gas outlet 36 (i.e., recycled gas outlet) is also in fluid communication with anode 14 of fuel cell 12, preferably through reformer 80 and/or pre-former 82. Second gas outlet 38 (i.e., exhaust gas outlet) is in fluid communication with gas exhaust or burner 70. Anode exhaust gas contains typically $H_2$ gas that is not used in fuel cell 12. In this embodiment, the anode exhaust gas is transported into first chamber 42 through first gas inlet 34 (i.e., anode exhaust inlet). The $H_2$ gas from the anode exhaust gas permeates through membrane 40 into second chamber 44, and is recycled back to anode 14 of fuel cell 12. The remaining gas in first chamber 42 that is $H_2$-gas deficient is directed out of the chamber to gas exhaust or burner 70 through second gas outlet 38 (i.e., exhaust gas outlet).

In one specific embodiment employing an $H_2$-gas permeable membrane for membrane 40, separator 30A (FIG. 2A) is employed.

In another specific embodiment employing $H_2$-gas permeable membrane 40A, separator 30B (FIG. 2B) or 30D (FIG. 2D) that includes second gas inlet 46 is employed. Second gas inlet 46 is a fuel gas inlet that is in fluid communication with fuel source 50. In this specific embodiment, a fuel gas, such as a natural gas, is transported into second chamber 44. In second chamber 44, the fuel gas is combined with the recycled anode exhaust that includes the $H_2$ gas permeated from first chamber 42 through membrane 40 into second chamber 44, and the combined gas stream is directed to anode 14 of fuel cell 12. In this embodiment, the fuel gas can help purge gases in second chamber 44 out through first gas outlet 36 (i.e., recycled gas outlet) to anode 14 of fuel cell 12.

In yet another specific embodiment employing $H_2$-gas permeable membrane 40A, separator 30C (FIG. 2C) or 30D (FIG. 2D) that includes third gas inlet 48 is employed. Third gas inlet 48 is a purging gas inlet that is in fluid communication with first chamber 42 and with cathode 16 of fuel cell 12, or oxygen gas source 60, such as an air source, or exhaust from exhaust gas or burner 70 (depicted in FIG. 1 with dotted lines 15, 17 and 19, respectively). The cathode exhaust from cathode 16, or the gas stream (e.g. air stream) from oxygen gas source 60, or exhaust gas or burner 70 is directed to first chamber 42 through third gas inlet 48. Such gas stream can help purge gases in first chamber 42 out through second gas outlet 38 (i.e., exhaust gas outlet). In this specific embodiment, a fuel gas, such as a natural gas, is transported into second chamber 44, and recycled back to anode 14 of fuel cell 12, as described above.

In some embodiments employing $H_2$-gas permeable membrane 40A, the $H_2$-gas permeable membrane is further selectively permeable to CO gas. Alternatively, the $H_2$-gas permeable membrane is further selectively permeable to CO and $H_2O$ gases. Alternatively, the $H_2$-gas permeable membrane is further selectively permeable to CO, $CO_2$ and $H_2O$.

Figures 3A, 3B:
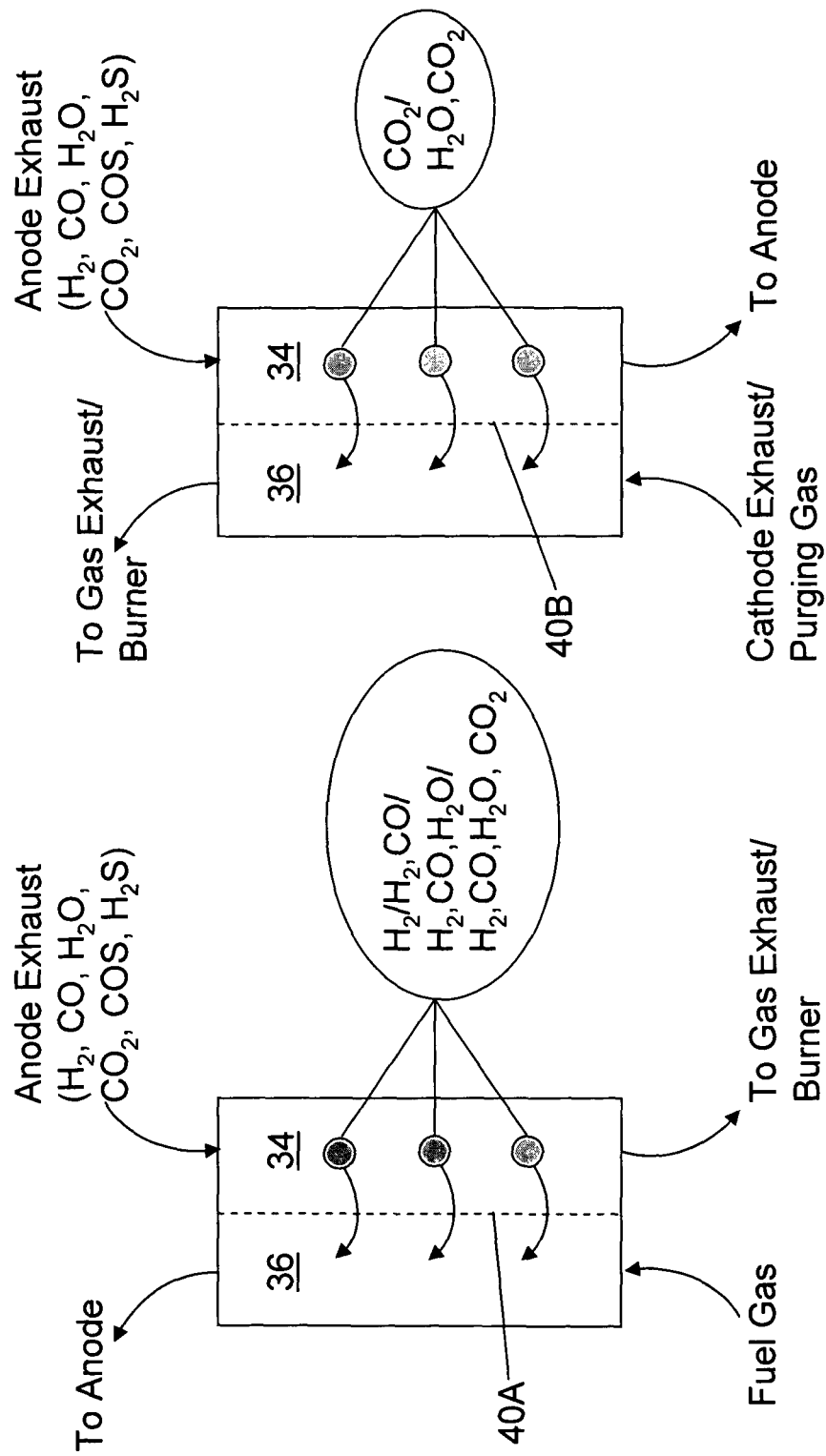
FIGS. 3A and 3B are schematic drawings showing gas flows in some separators that can be used in the invention.

FIG. 3A shows gas flows in separator 30 where membrane 40A can selectively permeate $H_2$ gas; $H_2$ gas, and CO gas; or $H_2$ gas, CO gas and $H_2O$ gas from first chamber 34 into second chamber 36. As shown in the figure, the permeated gas(es) into second chamber 36 is recycled, and the remaining gas(es) in first chamber 34 is directed to gas exhaust or burner 70.

Referring to FIGS. 1 and 2A-2D, in another embodiment of fuel cell system 100, separator 30 employs $CO_2$-gas permeable membrane 40B that can selectively permeate at least $CO_2$ gas. Preferably, the $CO_2$-gas permeable membrane selectively does not permeate $H_2$ gas. In this embodiment, first gas inlet 34, first gas outlet 36 and second gas outlet 38 are anode exhaust inlet, exhaust gas outlet and recycled gas outlet, respectively. In this embodiment, first gas inlet 34 is in fluid communication with anode 14 of fuel cell 12. First gas outlet 36 (exhaust gas outlet) is in fluid communication with gas exhaust or burner 70. Second gas outlet 38 (recycled gas outlet) is in fluid communication with anode 14 of fuel cell 12, preferable through reformer 80 and/or pre-former 82. In this embodiment, anode exhaust gas is transported into first chamber 42 through first gas inlet 34 (i.e., anode exhaust inlet). The $CO_2$ gas contained in the anode exhaust gas permeates through membrane 40 into second chamber 44 and is purged out to gas exhaust or burner 70. The $H_2$ gas contained in the anode exhaust gas remains in first chamber 42 and is directed to anode 14 of fuel cell 12 through second gas outlet 38 (i.e., recycled gas outlet) for recycling.

In one specific embodiment employing $CO_2$-gas permeable membrane permeable membrane 40B, separator 30A (FIG. 2A) is employed.

In another specific embodiment employing $CO_2$-permeable membrane permeable membrane 40B, separator 30B (FIG. 2B) or 30D (FIG. 2D) that includes second gas inlet 46 is employed. Second gas inlet 46 is a purging gas inlet that is in fluid communication with either cathode 16 of fuel cell 12, or oxygen gas source 60, or exhaust from gas exhaust or burner 70 (depicted in FIG. 1 with dotted lines 15, 17 and 21, respectively). The cathode exhaust from cathode 16, or the gas stream (e.g. air stream) from oxygen gas source 60, or exhaust from exhaust gas or burner 70 is directed to second chamber 44 through second gas inlet 46 (i.e., purging gas inlet). Such gas stream can help purge gases in second chamber 44 out through first gas outlet 36 (i.e., exhaust gas outlet). In this specific embodiment, a fuel gas, such as a natural gas, is transported into first chamber 42, and recycled back to anode 14 of fuel cell 12 through second gas outlet 38 (i.e., recycled gas outlet), as described above.

In yet another specific embodiment employing $CO_2$-gas permeable membrane 40B, separator 30C (FIG. 30C) or 30D (FIG. 30D) that includes third gas inlet 48 is employed. Third gas inlet 48 is a fuel gas inlet that is in fluid communication with first chamber 42 and with fuel source 50. In this specific embodiment, a fuel gas, such as a natural gas, is transported into first chamber 42 of separator 30. In first chamber 42, the fuel gas is combined with the recycled anode exhaust that includes the $H_2$ gas, and the combined gas stream is directed to anode 14 of fuel cell 12 through second gas outlet 38 (i.e., recycled gas outlet). In this embodiment, the fuel gas can help purge gases in first chamber 42 out through second gas outlet 38 (i.e., recycled gas outlet) to anode 14 of fuel cell 12.

In some embodiments employing $CO_2$-gas permeable membrane 40B, the $CO_2$-gas permeable membrane is further selectively permeable to $H_2O$ gas.

FIG. 3B shows gas flows in separator 30 where membrane 40B can selectively permeate $CO_2$ gas, or $CO_2$ and $H_2O$ gases. As shown in the figure, the permeated gas(es) into second chamber 36 is directed to gas exhaust or burner 70, and the remaining gas(es) in first chamber 34 is recycled.

Referring back to FIG. 1, in one preferred embodiment, fuel cell system 100 further includes reformer 80 and optionally pre-reformer 82, which is in fluid communication with separator 30 and anode 14 of fuel cell 12. Reformer 80 includes a catalyst to convert a fuel source, such as natural gas or other hydrocarbon fuel sources, into hydrogen gas. Pre-reformer 82 can remove heavy hydrocarbons to prevent carbon formation in reformer 80 or fuel cell stack 10. Generally, fuel and steam are fed into pre-reformer 82, and heavy hydrocarbons of the fuel are reformed to syngas, such as methane. The syngas formed at pre-reformer 82 is then fed into reformer 80 and converted into hydrogen gas. Pre-former 82 generally operates at about 350° C. to 550° C. adiabatically. Un-reacted hydrocarbons of the fuel at pre-former 82 can be reformed in reformer 80. Alternatively, when high temperature fuel cell stack 10 is employed (e.g., at a temperature about 350° C. to 550° C.), the un-reacted hydrocarbons can be reformed at fuel cell stack 10. Preferably, the steam to be used at pre-reformer 82 or reformer 80 is from the recycled anode exhaust.

In the embodiment where reformer 80 and optionally pre-reformer 82 are employed, recycled exhaust gas from separator 30 is directed to reformer 80 optionally via pre-reformer 82. In one particular embodiment, fuel gas from fuel source 50 is directed to separator 30 and combined with the recycled gas, and the combined gas stream is directed to reformer 80, as depicted with dotted route 11 in FIG. 1. In another specific embodiment, fuel gas from fuel source 50 is directly in fluid communication with reformer 80 independently from recycled exhaust gas stream, as depicted with dotted route 13 in FIG. 1. In yet another specific embodiment, fuel gas from fuel source 50 is directly in fluid communication with anode 14.

Any suitable reformer and pre-reformer known in the art can be used in the invention. Specific examples of suitable reformers include steam reformers, auto-thermal reformers and partial oxidation reformers. Generally, an oxidizer is combined with the fuel (e.g., natural gas) to generate hydrogen gas and oxidized byproduct(s) (e.g., CO or $CO_2$). For the oxidizer, typically, steam reformers use steam, while partial oxidation reformers use oxygen gas, and auto-thermal reformers use both steam and oxygen gas.

Although a reformer, separate from fuel cell stack 10, is depicted in FIG. 1, alternatively, fuel cell stack 10 can include fuel cell 12 that functions as an internally reforming fuel cell. Within such internally reforming fuel cell, reformation of natural gas or other hydrocarbon fuels into hydrogen gas can be accomplished. One example of such internally reforming fuel cell is a steam reforming fuel cell where hot steam generated from cathode of the fuel cell is used for the catalytic conversion of fuels into hydrogen gas.

Fuel cell system 100 can further includes power conditioner 90, as shown in FIG. 1. Typically, fuel cell 12 generates direct current electricity, which may require conditioning before serving. Power conditioner 90 processes the electricity generated from fuel cell 12 into, for example, alternating current or regulated direct current.

In some embodiments, fuel source is hydrogen gas itself. In these embodiments, reformer 80 is not required, and the hydrogen gas from fuel source 50 and the recycled anode exhaust are directly in fluid communication with anode 14 of fuel cell 12.

Although, in FIG. 1, separate gas channels, anode and cathode flow fields 20, 22, are described, electrodes that define at least in part gas channels can also be used in the invention.

Fuel cell systems of the invention can be made by any suitable method known in the art. Exemplary methods can be found in "High Temperature Solid Oxide Fuel Cells: Fundamentals, Design and Applications," Dinghal, et al. Ed., Elsevier Ltd. (2003), the entire teachings of which are incorporated herein by reference.

Any suitable membrane known in the art can be used for forming membrane 40 of separator 30. Preferably, membrane 40 is a membrane that can be operated at high temperatures, such as greater than about 100° C. Membrane 40 can be a polymer-, ceramic- or nanotube-based membrane. Ceramic membranes include silica-based and zeolite-based membranes. Specific examples of $H_2$ gas permeable polymer membranes include polyimides, polysulfones, polysulfone silicones, and cellulose acetates. Specific examples of $CO_2$-permeable polymer membranes include polydimethylsiloxane (PDMS) and cross-linked poly(ethylene glycol)dicarylate (PEGda).

Any suitable anode and cathode materials known in the art can be used in the invention. Specific examples of suitable anode and cathode materials can be found, for example, in "High Temperature Solid Oxide Fuel Cells: Fundamentals, Design and Applications," pp. 119-169, Dinghal, et al. Ed., Elsevier Ltd. (2003). Specific examples of the cathode materials include includes a La-manganate based material (e.g., $La_{1-x}MnO_3$, where x=0-0.1). In a specific embodiment, the La-manganate based materials are doped with one or more suitable dopants, such as Sr, Ca, Ba or Mg. Examples of doped La-manganate based materials include LaSr-manganates (e.g., $La_{1-x}Sr_xMnO_3$, where x=0.1-0.3, (La+Sr)/Mn=1.0-0.95 (molar ratio)) and LaCa-manganates (e.g., $La_{1-x}Ca_xMnO_3$, where x=0.1-0.3, (La+Ca)/Mn=1.0-0.95 (molar ratio)). Specific examples of the anode materials include a Ni cermet. The "Ni cermet" generally refers to a ceramic metal composite that includes Ni, such as about 20 wt %-70 wt % of Ni. Examples of Ni cermets are materials that include Ni and yttria-stabilized zirconia (YSZ), such as $ZrO_2$ containing about 15 wt % of $Y_2O_3$, and materials that include Ni and YSr-zirconia.

Any suitable electrolyte material known in the art can be used for electrolyte 18 of the invention. Preferably, electrolyte 18 is a solid electrolyte. Suitable specific solid electrolytes can be found, for example, in "High Temperature Solid Oxide Fuel Cells: Fundamentals, Design and Applications," pp. 83-112, Dinghal, et al. Ed., Elsevier Ltd. (2003). Specific examples include $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}CO_{0.05}O_3$, $La_{0.9}Sr_{0.1}Ga_{0.8}Mg_{0.2}O_3$, $LaSrGaO_4$, $LaSrGa_3O_7$ or $La_{0.9}A_{0.1}Ga_3$ where A=Sr, Ca or Ba); and mixtures thereof. Other examples include doped yttrium-zirconate (e.g., $YZr_2O_7$), doped gadolinium-titanate (e.g., $Gd_2Ti_2O_7$) and brownmillerites (e.g., $Ba_2In_2O_6$ or $Ba_2In_2O_5$).

Any suitable thickness of anode 14 and cathode 16 can be employed in the invention. In one specific embodiment, the thickness of anode 14 and cathode 16 is each independently in a range of between about 1 mm and about 2 mm.

Any suitable thickness of electrolyte 18 can be employed in the invention. In one specific embodiment, the thickness of electrolyte 18 is in a range of between about 5 μm and about 20 μm, such as between about 5 μm and about 10 μm. In another specific embodiment, the thickness of electrolyte 18 is thicker than about 100 μm.

Although not shown in FIG. 1, when a plurality of fuel cells 12 are employed, fuel cell stack 10 further includes an interconnect between fuel cells 12. Any suitable interconnect can be used in the invention. Specific examples can be found in "High Temperature Solid Oxide Fuel Cells: Fundamentals, Design and Applications," pp. 173-190, Dinghal, et al. Ed., Elsevier Ltd. (2003). Other specific examples can be found in U.S. Provisional Application Nos. 60/877,502, 60/877,504 and 60/877,503, the entire teachings of which are incorporated herein by reference.

The present invention is also directed to a method of forming a fuel cell system, comprising the steps of forming a fuel cell stack that includes at least one fuel cell, the fuel cell includes an anode, a cathode and an electrolyte between the anode and cathode, and forming a separator that includes a housing defining an anode exhaust inlet, a recycled gas outlet and an exhaust gas outlet, wherein the anode exhaust inlet and the recycled gas outlet are, independently, in fluid communication with the anode, and an $H_2$-gas permeable membrane, the housing and the membrane defining at least in part a first chamber and a second chamber, the first chamber being in fluid communication with the anode exhaust inlet and the exhaust gas outlet, the second chamber being in fluid communication with the recycled gas outlet. In a specific embodiment, the membrane is further selectively permeable to CO gas. In another specific embodiment, the membrane is further selectively permeable to CO and $H_2O$ gases. In yet another specific embodiment, the membrane is further selectively permeable to CO, $CO_2$ and $H_2O$ gases.

In one specific embodiment, the housing of the separator further defines a purging gas inlet in fluid communication with the first chamber and with the cathode of the fuel cell or a source of air. The method further includes the step of forming a reformer that is between, and in fluid communication with, the recycled gas outlet and the anode, wherein the reformer includes a catalyst that converts a fuel gas to $H_2$ gas. The housing of the separator further defines a fuel gas inlet in fluid communication with a fuel gas source and the second chamber of the separator. The reformer is in fluid communication with a fuel gas source. The anode of the fuel cell is in direct fluid communication with a fuel gas source.

In another specific embodiment, the method of recycling anode exhaust gas in a fuel cell system includes a fuel cell stack that includes at least one fuel cell, the fuel cell including an anode, a cathode and an electrolyte between the anode and cathode, comprising the steps of directing anode exhaust gas including $H_2$ gas from the anode of the fuel cell to a separator, the separator including a housing defining an anode exhaust inlet, a recycled gas outlet and an exhaust gas outlet, wherein the anode exhaust inlet and the recycled gas outlet are, independently, in fluid communication with the anode, and an $H_2$-gas permeable membrane, the housing and the membrane defining at least in part a first chamber and a second chamber, the first chamber being in fluid communication with the anode exhaust inlet and the exhaust gas outlet, the second chamber being in fluid communication with the recycled gas outlet, whereby the anode exhaust gas is transported into the first chamber through the anode exhaust inlet, and at least a portion of the $H_2$ gas in the anode exhaust gas permeates the membrane to the second chamber, thereby forming recycled anode-exhaust gas, and directing the recycled anode-exhaust gas to the anode of the fuel cell. The anode exhaust gas further contains CO and $H_2O$, and the membrane is further selectively permeable to CO gas, to thereby cause the CO gas of the anode exhaust gas to pass from the first chamber into the second chamber. In yet another specific embodiment, the anode exhaust gas further contains CO and $H_2O$, and the membrane is further selectively permeable to CO and $H_2O$ gases, to thereby cause the CO and $H_2O$ gases of the anode exhaust gas to pass from the first chamber into the second chamber. In another specific embodiment the anode exhaust gas further contains CO and $H_2O$, and the membrane is further selectively permeable to CO, $CO_2$ and $H_2O$ gases, to thereby cause the CO, $CO_2$ and $H_2O$ gases of the exhaust gas to pass from the first chamber into the second chamber.

In one specific embodiment, the method further includes the step of directing the $H_2$-deficient exhaust gas out of the first chamber through the exhaust gas outlet to a gas exhaust or a burner. The housing of the separator further defines a purging gas inlet in fluid communication with the first chamber and with the cathode of the fuel cell or a source of air, and the method further includes the step of directing a stream of air from the air source, or a stream of cathode exhaust gas from the cathode of the fuel cell, into the first chamber through the purging gas inlet, to thereby cause the $H_2$-deficient exhaust gas to be directed out of the first chamber by the air or cathode exhaust gas stream.

In another specific embodiment, the method further includes the step of directing a fuel gas from a source of the fuel gas to a reformer positioned between, and in fluid communication with, the recycled gas outlet and the anode, whereby the reformer converts the fuel gas to $H_2$ gas. The housing of the separator further defines a fuel gas inlet in fluid communication with the second chamber, and the fuel gas is directed from the fuel gas source to the reformer through the separator.

In yet another specific embodiment, the method further includes the step of directing the fuel gas from the fuel gas source to the second chamber of the separator through the fuel gas inlet. In one specific embodiment, the method further includes the step of directing the recycled anode-exhaust gas from the separator to the reformer through the recycled gas outlet. In another specific embodiment, the method further includes the step of directing the $H_2$ gas converted at the reformer and the $H_2$ gas of the recycled anode-exhaust gas from the reformer to the anode of the fuel cell. In yet another specific embodiment, the method further includes the step of directing the fuel gas from the fuel source to the reformer independently from the recycled anode-exhaust gas. In one specific embodiment, the method further includes the step of directing the fuel gas from the fuel source to join the recycled anode-exhaust gas to thereby direct the fuel gas and the recycled anode-exhaust gas that has passed through the separator to the reformer.

In a specific embodiment, the invention relates to a method of forming a fuel cell system, comprising the steps of forming a fuel cell stack that includes at least one fuel cell, the fuel cell including an anode, a cathode and an electrolyte between the anode and cathode, and forming a separator that includes, a housing defining an anode exhaust inlet, a recycled gas outlet and an exhaust gas outlet, wherein the anode exhaust inlet and the recycled gas outlet are, independently, in fluid communication with the anode, and a $CO_2$-gas permeable membrane, the housing and the membrane defining at least in part a first chamber and a second chamber, the first chamber being in fluid communication with the anode exhaust inlet and the recycled gas outlet, the second chamber being in fluid communication with the exhaust gas outlet. In another specific embodiment, the $CO_2$-gas permeable membrane is further selectively permeable to $H_2O$ gas. In one specific embodiment, the housing of the separator further defines a purging gas inlet in fluid communication with the second chamber and with the cathode of the fuel cell or a source of air.

In another specific embodiment, the method further includes the step of forming a reformer that is between, and in fluid communication with, the recycled gas outlet and the anode, wherein the reformer includes a catalyst that converts a fuel gas to $H_2$ gas. The housing of the separator further defines a fuel gas inlet in fluid communication with a fuel gas source and the second chamber of the separator. The reformer is in fluid communication with a fuel gas source. The anode of the fuel cell is in fluid communication with a fuel gas source.

In yet another specific embodiment, the invention relates to a method of recycling anode exhaust gas in a fuel cell system that includes a fuel cell stack including at least one fuel cell, the fuel cell including an anode, a cathode and an electrolyte between the anode and cathode, comprising the steps of directing anode exhaust gas containing $CO_2$ and $H_2$ gases from the anode of the fuel cell to a separator that includes, a housing defining an anode exhaust inlet, a recycled gas outlet and an exhaust gas outlet, wherein the anode exhaust inlet and the recycled gas outlet are, independently, in fluid communication with the anode, and a $CO_2$-gas permeable membrane, the housing and the membrane defining at least in part a first chamber and a second chamber, the first chamber being in fluid communication with the anode exhaust inlet and the recycled gas outlet, the second chamber being in fluid communication with the exhaust gas outlet, whereby the anode exhaust gas is transported into the first chamber through the anode exhaust inlet, and at least a portion of the $CO_2$ gas contained in the anode exhaust gas permeates through the membrane into the second chamber to thereby form $CO_2$-rich exhaust gas in the second chamber, and form recycled anode-exhaust gas that is $CO_2$-gas deficient in the first chamber, and directing the recycled anode-exhaust gas to the anode of the fuel cell. In one specific embodiment, the anode exhaust gas further contains CO and $H_2O$. In another specific embodiment, the membrane is further selectively permeable to $H_2O$ gas, to thereby cause the $H_2O$ gas of the anode exhaust gas to pass from the first chamber into the second chamber. In yet another specific embodiment, the method further includes the step of directing the $CO_2$-rich exhaust gas out of the second chamber through the exhaust gas outlet. The housing of the separator further defines a purging gas inlet in fluid communication with the second chamber and with the cathode of the fuel cell or a source of air. In one specific embodiment, the method further includes the step of directing a stream of air from the air source, or a stream of cathode exhaust gas from the cathode of the fuel cell, into the second chamber through the purging gas inlet, to thereby cause the $CO_2$-rich exhaust gas to be directed out of the second chamber by the air or cathode exhaust gas stream. In another specific embodiment, the method further includes the step of directing a fuel gas from a source of the fuel gas to a reformer positioned between, and in fluid communication with, the recycled gas outlet and the anode, wherein the reformer converts the fuel gas to $H_2$ gas. The housing of the separator further defines a fuel gas inlet in fluid communication with the first chamber, and the fuel gas is directed from the fuel gas source to the reformer through the separator. In yet another specific embodiment, the method further includes the step of directing the fuel gas from the fuel gas source to the first chamber of the separator through the fuel gas inlet. In one specific embodiment, the method further includes the step of directing the fuel gas and the recycled anode-exhaust gas from the separator to the reformer through the recycled gas outlet. In a specific embodiment, the method further includes the step of directing the $H_2$ gas converted at the reformer and $H_2$ gas of the recycled anode-exhaust gas from the reformer to the anode of the fuel cell. In another specific embodiment, the method further includes the step of directing the fuel gas from the fuel source to the reformer independently from the recycled anode-exhaust gas. In yet another specific embodiment, the method further includes the step of directing the fuel gas from the fuel source to join the recycled anode-exhaust gas to thereby direct the fuel gas and the recycled anode-exhaust gas that has passed through the separator to the reformer.

Equivalents

While this invention has been particularly shown and described with references to example embodiments thereof, it will be understood by those skilled in the art that various changes in form and details may be made therein without departing from the scope of the invention encompassed by the appended claims.

What is claimed is:

1. A fuel cell system, comprising:
   a) a fuel cell stack that includes at least one fuel cell, the fuel cell including,
      i) a cathode,
      ii) an anode, and
      iii) an electrolyte between the cathode and the anode; and
   b) a separator, including,
      i) a housing defining an anode exhaust inlet, a recycled gas outlet and an exhaust gas outlet, wherein the anode exhaust inlet and the recycled gas outlet are, independently, in fluid communication with the anode, and
      ii) an $H_2$-gas permeable membrane, the housing and the membrane defining at least in part a first chamber disposed on a first side of the membrane and a second chamber disposed on a second side of the membrane opposite from the first side of the membrane, the first chamber being in fluid communication with the anode exhaust inlet and the exhaust gas outlet, the second chamber being in fluid communication with the recycled gas outlet, wherein the housing of the separator further defines a purging gas inlet in fluid communication with the first chamber and with the cathode of the fuel cell or a source of oxygen.

2. The fuel cell system of claim 1, wherein the membrane is further selectively permeable to at least one of CO, $CO_2$ and $H_2O$ gases.

3. The fuel cell system of claim 1, wherein the housing of the separator further defines a purging gas inlet in fluid communication with second chamber and with a fuel source.

4. The fuel cell system of claim 3, further including a reformer that is between, and in fluid communication with, the recycled gas outlet of the separator and the anode of the fuel cell, wherein the reformer includes a catalyst that converts a fuel gas to $H_2$ gas.

5. The fuel cell system of claim 1, wherein the membrane comprises a nanotube-based membrane.

6. A method of forming a fuel cell system, comprising the steps of:
   a) forming a fuel cell stack that includes at least one fuel cell, the fuel cell includes an anode, a cathode and an electrolyte between the anode and cathode; and
   b) forming a separator that includes,
      i) a housing defining an anode exhaust inlet, a recycled gas outlet and an exhaust gas outlet, wherein the anode exhaust inlet and the recycled gas outlet are, independently, in fluid communication with the anode, and
      ii) an $H_2$-gas permeable membrane, the housing and the membrane defining at least in part a first chamber disposed on a first side of the membrane and a second chamber disposed on a second side of the membrane opposite from the first side of the membrane, the first chamber being in fluid communication with the anode exhaust inlet and the exhaust gas outlet, the second chamber being in fluid communication with the recycled gas outlet, wherein the housing of the separator further defines a purging gas inlet in fluid communication with the first chamber and with the cathode of the fuel cell or a source of oxygen.

7. The method of claim 6, wherein the membrane is further selectively permeable to at least one of CO, $CO_2$ and $H_2O$ gases.

8. The method of claim 6, wherein the housing of the separator further defines a purging gas inlet in fluid communication with the second chamber and with a fuel source.

9. The method of claim 8, further including the step of forming a reformer that is between, and in fluid communication with, the recycled gas outlet and the anode, wherein the reformer includes a catalyst that converts a fuel gas to $H_2$ gas.

10. The method of claim 6, wherein the membrane comprises a nanotube-based membrane.

* * * * *